US009880711B2

(12) United States Patent
Robison et al.

(10) Patent No.: US 9,880,711 B2
(45) Date of Patent: Jan. 30, 2018

(54) ADAPTIVE ALERT DURATION

(71) Applicant: Google Inc., Mountain View, CA (US)

(72) Inventors: Austin Robison, Sunnyvale, CA (US); Alexander Faaborg, Mountain View, CA (US)

(73) Assignee: Google LLC, Mountain View, CA (US)

( * ) Notice: Subject to any disclaimer, the term of this patent is extended or adjusted under 35 U.S.C. 154(b) by 476 days.

(21) Appl. No.: 14/244,631

(22) Filed: Apr. 3, 2014

(65) Prior Publication Data

US 2015/0205465 A1 Jul. 23, 2015

Related U.S. Application Data

(60) Provisional application No. 61/930,171, filed on Jan. 22, 2014.

(51) Int. Cl.
*G06F 3/00* (2006.01)
*G06F 3/0484* (2013.01)
*G06Q 10/10* (2012.01)
*G06F 3/0481* (2013.01)

(52) U.S. Cl.
CPC ......... *G06F 3/0484* (2013.01); *G06Q 10/107* (2013.01); *G06Q 10/109* (2013.01); *G06F 3/0481* (2013.01)

(58) Field of Classification Search
CPC ... G06F 3/0484; G06F 3/0481–3/0489; G06Q 10/107; G06Q 10/109
See application file for complete search history.

(56) References Cited

U.S. PATENT DOCUMENTS

| 5,617,526 | A | * | 4/1997 | Oran | G06F 3/0481 715/779 |
| 5,859,640 | A | * | 1/1999 | de Judicibus | G06F 3/0481 715/710 |
| 5,910,802 | A | * | 6/1999 | Shields | G06F 3/0488 345/173 |
| 5,995,101 | A | | 11/1999 | Clark et al. | |

(Continued)

FOREIGN PATENT DOCUMENTS

EP 1947559 A1 7/2008

OTHER PUBLICATIONS

International Preliminary Report on Patentability from International Application No. PCT/US2015/012239, dated Aug. 4, 2016 7 pgs.

(Continued)

*Primary Examiner* — Steven B Theriault
(74) *Attorney, Agent, or Firm* — Shumaker & Sieffert, P.A.

(57) ABSTRACT

A computing device may output, for display at a display device, a graphical user interface. The computing device may receive a plurality of indications of user interaction with the computing device. The computing device may determine a set of one or more time intervals between receiving at least two of the plurality of indications of user interaction with the computing device. The computing device may determine, based at least in part on the determined set of one or more time intervals, a length of time to visually emphasize an alert in the graphical user interface. The computing device may visually emphasize, for the length of time, the alert in the graphical user interface.

14 Claims, 4 Drawing Sheets

(56) References Cited

U.S. PATENT DOCUMENTS

| | | | |
|---|---|---|---|
| 6,342,908 B1* | 1/2002 | Bates | G06F 3/0481 715/789 |
| 6,459,440 B1* | 10/2002 | Monnes | G06F 3/0481 715/808 |
| 6,477,117 B1 | 11/2002 | Narayanaswami et al. | |
| 6,477,177 B1 | 11/2002 | Narayanaswami et al. | |
| 6,538,660 B1* | 3/2003 | Celi, Jr. | G09G 5/14 345/592 |
| 6,563,514 B1* | 5/2003 | Samar | G06F 17/30899 707/E17.119 |
| 6,577,329 B1 | 6/2003 | Flickner et al. | |
| 6,618,716 B1* | 9/2003 | Horvitz | G06F 9/4443 706/20 |
| 6,873,314 B1 | 3/2005 | Campbell | |
| 6,954,905 B2* | 10/2005 | Brown | G09G 5/14 715/768 |
| 7,019,757 B2* | 3/2006 | Brown | G06F 3/0481 345/589 |
| 7,046,254 B2* | 5/2006 | Brown | G06F 3/0481 345/592 |
| 7,120,865 B1* | 10/2006 | Horvitz | G06Q 10/107 709/207 |
| 7,146,573 B2* | 12/2006 | Brown | G06F 3/0481 715/768 |
| 7,155,729 B1* | 12/2006 | Andrew | G06F 9/4446 715/700 |
| 7,243,130 B2* | 7/2007 | Horvitz | G05B 19/404 709/206 |
| 7,249,326 B2* | 7/2007 | Stoakley | G06F 3/04817 715/772 |
| 7,250,955 B1* | 7/2007 | Beeman | G06F 9/4443 345/592 |
| 7,417,650 B1* | 8/2008 | Horvitz | G06F 9/4443 715/764 |
| 7,475,348 B2* | 1/2009 | Lin | G06F 3/04812 715/711 |
| 7,620,905 B2* | 11/2009 | Boss | G06F 3/0481 715/766 |
| 7,711,806 B1 | 5/2010 | Roka et al. | |
| 7,743,340 B2* | 6/2010 | Horvitz | G05B 19/404 715/710 |
| 7,844,666 B2* | 11/2010 | Horvitz | G06Q 10/107 709/206 |
| 7,996,045 B1* | 8/2011 | Bauer | G06F 3/0488 455/466 |
| 8,019,834 B2* | 9/2011 | Horvitz | G05B 19/404 702/150 |
| 8,086,672 B2* | 12/2011 | Horvitz | G06Q 10/107 709/206 |
| 8,160,900 B2 | 4/2012 | Taub et al. | |
| 8,266,612 B2* | 9/2012 | Rathi | G06F 8/65 715/808 |
| 8,542,675 B2* | 9/2013 | Cormier | H04M 1/72563 358/1.15 |
| 8,548,431 B2* | 10/2013 | Teng | H04M 1/67 455/411 |
| 8,631,419 B2* | 1/2014 | Horvitz | G06F 9/485 719/318 |
| 8,723,823 B2* | 5/2014 | Shia | G06Q 10/10 345/173 |
| 8,738,972 B1* | 5/2014 | Bakman | G06F 11/0712 714/47.1 |
| 8,751,500 B2* | 6/2014 | Duarte | G06F 17/30598 707/737 |
| 8,839,142 B2* | 9/2014 | Chaudhri | G06F 3/048 715/788 |
| 8,892,674 B2* | 11/2014 | Horvitz | G06Q 10/107 709/206 |
| 8,893,033 B2* | 11/2014 | Donahue | G06F 3/04817 715/764 |
| 8,972,892 B2* | 3/2015 | Schuller | G06F 9/4443 715/808 |
| 9,015,641 B2* | 4/2015 | Bocking | G06F 3/017 715/863 |
| 9,043,715 B2* | 5/2015 | Nolterieke | G06F 9/4443 715/768 |
| 9,118,614 B1* | 8/2015 | Rogers | H04L 51/36 |
| 9,154,606 B2* | 10/2015 | Tseng | H04M 1/72552 |
| 9,218,593 B2* | 12/2015 | Kim | G06Q 10/109 |
| 9,282,587 B2* | 3/2016 | Winkler | H04W 88/02 |
| 9,406,103 B1* | 8/2016 | Gray | G06T 3/0068 |
| 9,448,685 B1* | 9/2016 | Somin | G06F 3/0481 |
| 9,519,417 B2* | 12/2016 | Logan | G06F 3/011 |
| 2002/0054117 A1* | 5/2002 | van Dantzich | G06F 3/0482 715/766 |
| 2002/0080156 A1* | 6/2002 | Abbott | G06F 1/163 715/700 |
| 2002/0161634 A1* | 10/2002 | Kaars | G06Q 30/02 705/14.55 |
| 2004/0059790 A1 | 3/2004 | Austin-Lane et al. | |
| 2004/0061716 A1* | 4/2004 | Cheung | G06F 9/542 715/710 |
| 2004/0225718 A1* | 11/2004 | Heinzel | G06Q 10/107 709/206 |
| 2005/0044500 A1* | 2/2005 | Orimoto | G06F 3/0481 715/706 |
| 2005/0120306 A1* | 6/2005 | Klassen | G06F 3/0482 715/765 |
| 2006/0093998 A1 | 5/2006 | Vertegaal | |
| 2007/0044086 A1* | 2/2007 | Sampath | G06F 8/20 717/168 |
| 2007/0067734 A1* | 3/2007 | Cunningham | G06F 3/04817 715/779 |
| 2009/0113298 A1* | 4/2009 | Jung | G06Q 30/0212 715/700 |
| 2009/0219166 A1* | 9/2009 | MacFarlane | H04M 1/72566 340/691.4 |
| 2009/0249247 A1* | 10/2009 | Tseng | H04M 1/72552 715/808 |
| 2010/0094681 A1 | 4/2010 | Almen et al. | |
| 2011/0004845 A1* | 1/2011 | Ciabarra | G06F 3/0481 715/808 |
| 2011/0106736 A1* | 5/2011 | Aharonson | G06Q 10/109 706/12 |
| 2011/0261079 A1* | 10/2011 | Ingrassia, Jr. | A63B 24/0062 345/665 |
| 2012/0102409 A1* | 4/2012 | Fan | H04W 4/00 715/738 |
| 2012/0131519 A1 | 5/2012 | Jitkoff | |
| 2012/0194976 A1 | 8/2012 | Golko et al. | |
| 2012/0229909 A1 | 9/2012 | Clavin et al. | |
| 2012/0258691 A1* | 10/2012 | Baer | G06F 3/0481 455/412.2 |
| 2012/0290109 A1* | 11/2012 | Engelberg | G06F 19/3481 700/91 |
| 2013/0145303 A1 | 6/2013 | Prakash et al. | |
| 2013/0222154 A1* | 8/2013 | Mori | G08G 1/09 340/905 |
| 2013/0331067 A1 | 12/2013 | Coussemaeker et al. | |
| 2013/0346408 A1 | 12/2013 | Duarte et al. | |
| 2013/0346882 A1 | 12/2013 | Shiplacoff et al. | |
| 2013/0346922 A1* | 12/2013 | Shiplacoff | G06F 3/04842 715/835 |
| 2014/0013196 A1* | 1/2014 | White | H04L 67/306 715/205 |
| 2014/0032259 A1 | 1/2014 | LaFever et al. | |
| 2014/0068494 A1 | 3/2014 | Petersen et al. | |
| 2014/0195918 A1 | 7/2014 | Friedlander | |
| 2014/0232645 A1 | 8/2014 | Ali et al. | |
| 2014/0249429 A1 | 9/2014 | Tran | |
| 2015/0111558 A1 | 4/2015 | Yang | |
| 2015/0160622 A1 | 6/2015 | Kim et al. | |

OTHER PUBLICATIONS

Narayanaswami et al., "Application design for a smart watch with a high resolution display," IEEE, 2000, 8 pages.

(56) References Cited

OTHER PUBLICATIONS

International Search Report and Written Opinion of International Application No. PCT/US2015/012239, dated Apr. 10, 2015 9 pp.

* cited by examiner

ADAPTIVE ALERT DURATION

This application claims the benefit of U.S. Provisional Application No. 61/930,171, filed Jan. 22, 2014, the entire content of which is hereby incorporated by reference.

BACKGROUND

An alert may be a message that can be outputted at a display device or otherwise communicated via, for example, sound or haptic feedback to notify a user of a computing device to an event, occurrence, or information that may be contextually relevant to the user. For example, an alert may notify a user of a computing device to an upcoming scheduled appointment, a new e-mail message, a missed telephone call, traffic conditions of the user's commute, and the like. Because an alert may be time-sensitive in nature, the alert may be continually outputted until the computing device receives an indication of user input to clear (i.e., terminate from outputting by the relevant output device) the alert, thereby ensuring that the user receives the alert before the computing device ceases outputting the alert.

SUMMARY

In one aspect, the disclosure is directed to a method. The method may include outputting, by a computing device, for display at a display device, a graphical user interface. The method may further include receiving, by the computing device, a plurality of indications of user interaction with the computing device. The method may further include determining, by the computing device, a set of one or more time intervals between receiving at least two of the plurality of indications of user interaction with the computing device. The method may further include determining, by the computing device and based at least in part on the set of one or more time intervals, a length of time to visually emphasize an alert in the graphical user interface. The method may further include visually emphasizing, by the computing device and for the length of time, the alert in the graphical user interface.

In another aspect, the disclosure is directed to a computer-readable storage medium encoded with instructions that, when executed, cause at least one processor of a computing device to: output, by the computing device, for display at a display device, a graphical user interface; receive, by the computing device, a plurality of indications of user interaction with the computing device; determine, by the computing device, a set of one or more time intervals between receiving at least two of the plurality of indications of user interaction with the computing device; determine, by the computing device and based at least in part on the set of one or more time intervals, a length of time to visually emphasize an alert in the graphical user interface; and visually emphasize, by the computing device and for the length of time, the alert in the graphical user interface.

In another aspect, the disclosure is directed to a computing system. The computing system may include at least one processor. The computing system may also include at least one module operable by the at least one processor to: output for display at a display device a graphical user interface; receive a plurality of indications of user interaction with the computing device; determine a set of one or more time intervals between receiving at least two of the plurality of indications of user interaction with the computing device; determine, based at least in part on the set of one or more time intervals, a length of time to visually emphasize an alert in the graphical user interface; and visually emphasize for the length of time the alert in the graphical user interface.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
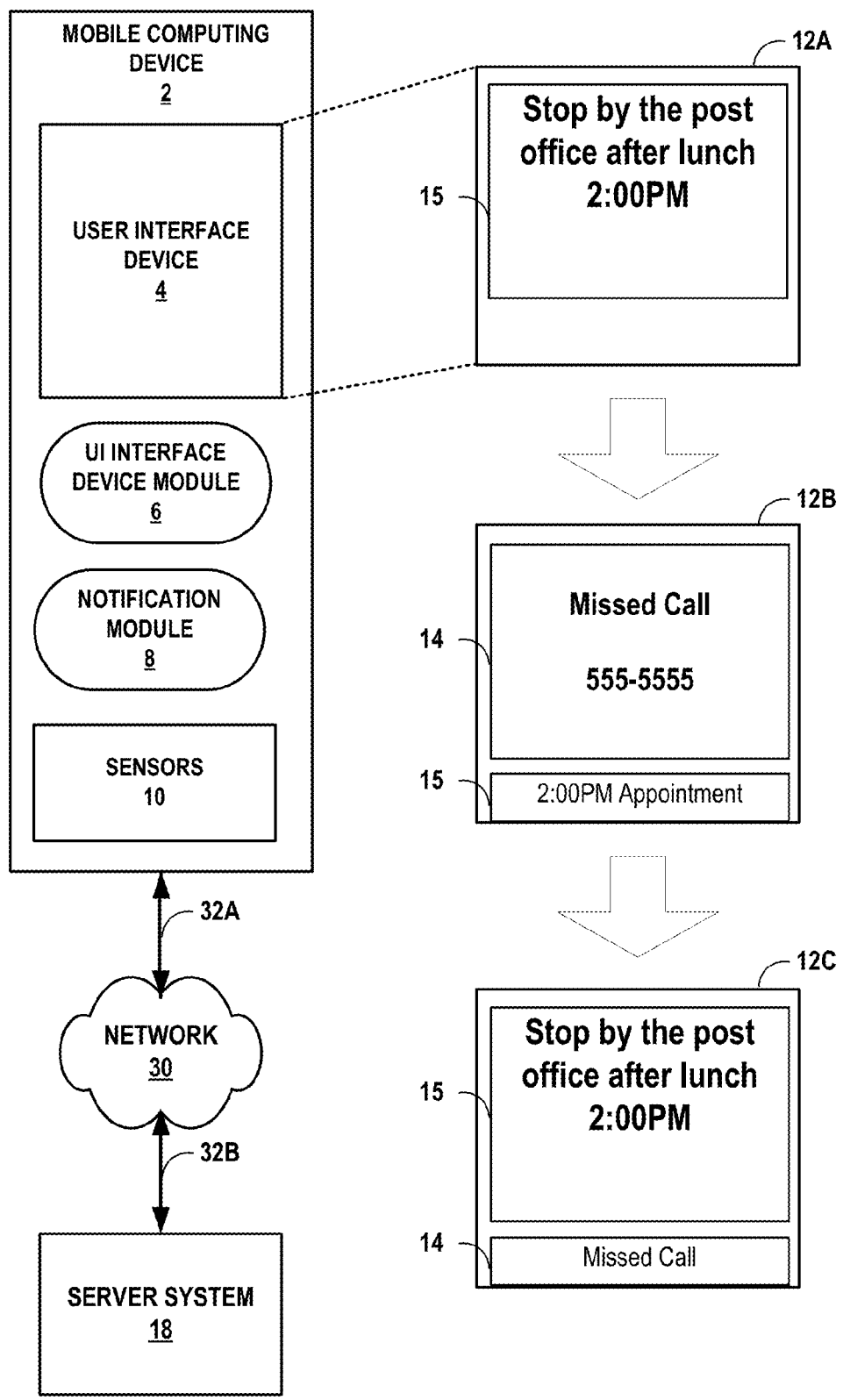
FIG. 1 is a conceptual diagram illustrating an example computing system configured to adaptively determine the length of time to visually emphasize an alert in accordance with one or more aspects of the present disclosure.

In general, aspects of the present disclosure are directed to techniques for adaptively determining the length of time that an alert is visually emphasized in a user interface outputted by a computing device for display at a display device. For example, a computing device may receive a plurality of indications of user interaction with the computing device and may determine a set of one or more time intervals between receiving at least two of the plurality of indications of user interaction with the computing device. The computing device may then determine, based at least in part on the set of one or more time intervals, a length of time to visually emphasize an alert in the graphical user interface, and may visually emphasize, for the length of time, the alert in the graphical user interface (GUI). Aspects of the present disclosure are also directed to techniques for adaptively determining the length of time that an alert is outputted by the computing device for display at the display device. The computing device may determine, based at least in part on the set of one or more time intervals, a length of time to output the alert for display at the display device, and may output for display the alert for the length of time.

In some implementations, the computing device may determine how frequently a user interacts with the computing device, and may accordingly adjust the length of time to output an alert for display such that the alert is displayed at least until the next expected user interaction with the computing device. For example, the computing device may output an alert (e.g., for display at a display device) and, shortly after the next expected user interaction, the computing device may cease outputting (i.e., clear) the alert. In some implementations, the computing device may determine how frequently a user interacts with the computing device, and may accordingly adjust the length of time to output an alert for display such that the alert is visually emphasized at least until the next expected user interaction with the computing device. In this way, the techniques disclosed herein may enabled the display device to be more efficiently utilized by not having an alert monopolize the display device until the alert is manually dismissed via user input, while also increasing the opportunity for an end user to view alerts displayed in the GUI.

In some examples, the computing device may determine a priority of information such as alerts outputted for display at a display device based at least in part on the contextual relevancy of the information. For example, the computing device may determine that, at 5:30 PM on a weekday, navigational information including current traffic conditions for a user's commute from the user's office to the user's home may be more contextually relevant to the user than, for example, package-tracking information about a package that is in transit to the user. The most contextually relevant information can be visually emphasized in the user interface relative to other information, so that the attention of a user of the computing device can be drawn to the most contextually relevant information for the user. When the computing device generates an alert in response to an event, the computing device may visually emphasize the alert in the user interface relative to other content for a determined length of time, even if the alert may not be the most contextually relevant information for the user. By adaptively determining the length of time to visually emphasize the alert, the computing device may minimize the time in which the ordering of information by contextual relevancy is subverted.

In implementations of the disclosed technology in which a computing device or computing system collects personal information about users, and/or makes use of personal information, such users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a conceptual diagram illustrating an example computing system configured to adaptively determine the length of time to visually emphasize an alert in accordance with one or more aspects of the present disclosure. In some examples, computing device 2 may be associated with a user that may interact with the computing device by providing various user inputs into the computing device. Examples of computing device 2 may include, but are not limited to, portable or mobile devices such as mobile phones (including smart phones), laptop computers, desktop computers, tablet computers, wearable computing devices such as smart watches, smart television platforms, cameras, personal digital assistants (PDAs), servers, mainframes, etc. As shown in the example of FIG. 1, computing device 2 may be a wearable computing device, such as a smart watch. Computing device 2, in some examples, may include user interface (UI) device 4, UI interface device module 6, notification module 8, and one or more sensors 10. Other examples of computing device 2 that implement techniques of this disclosure may include additional components not shown in FIG. 1.

Computing device 2 may include UI device 4. In some examples, UI device 4 may be configured to receive tactile, audio, or visual input. UI device 4, as shown in FIG. 1, may include a touch-sensitive and/or presence-sensitive display or any other type of device for receiving input. UI device 4 may output content such as graphical user interface (GUI) 12 for display. In the example of FIG. 1, UI device 4 may be a presence-sensitive display that may display a graphical user interface and receive input using capacitive, inductive, and/or optical detection at or near the presence-sensitive display.

As shown in FIG. 1, computing device 2 may include UI device module 6. UI device module 6 may perform one or more functions to receive input, such as user input, and send such input to other components associated with computing device 2. For example, UI device module 6 may determine a gesture performed at UI device 4. UI device module 6 may also receive data from components associated with computing device 2, such as notification module 8. Using the data, UI device module 6 may cause other components associated with computing device 2, such as UI device 4, to provide output based on the data. For instance, UI device module 6 may receive data from notification module 8 that causes UI device 4 to display information, such as an alert, within GUI 12.

In accordance with techniques of the present disclosure, computing device 2 may output, for display at UI device 4, GUI 12. GUI 12 may be a user interface that includes graphical icons and other visual indicators that a user may interact with to operate computing device 2, so that computing device may output, for display at UI device 4, the graphical icons and visual indicators included in GUI 12. GUI 12 may present textual, graphical, and/or video content, such as alert 14, for display at UI device 4.

As shown in FIG. 1, GUI 12 may be a user interface generated by UI device module 6 that allows a user to interact with computing device 2. GUI 16 may include graphical content. Graphical content, generally, may include text, images, a group of moving images, etc. In the example shown in FIG. 1, graphical content may include alert 14 generated by notification module 8, which may be an indication that a new message has been received by mobile computing device 2.

UI device module 6 may be implemented in various ways. For example, UI device module 6 may be implemented as a downloadable or pre-installed application or "app." In another example, UI device module 6 may be implemented as part of a hardware unit of computing device 2. In another example, UI device module 6 may be implemented as part of an operating system of computing device 2. In some instances, portions of the functionality of UI device module 6 or any other module described in this disclosure may be implemented across any combination of an application, hardware unit, and operating system.

Computing device 2 may include notification module 8. Notification module 8 may perform one or more functions to generate alerts and to send data to UI device module 6 to cause UI device 4 to display the generated alerts. Alerts generated by notification module 8 may include content such as text, graphics, audio, video, and the like that includes information indicative of an event that triggered notification module 8 to generate the alerts. Notification module 8 may further perform one or more functions to determine the length of time for which alerts are visually emphasized at UI device 4. Notification module 8 may communicate the determined length of time for which alerts are visually emphasized to UI device module 6 to cause UI device 4 to visually emphasize the alerts for the length of time as determined by notification module 8.

Notification module 8 may generate alerts, such as alert 14 that may be outputted by UI device 4 in response to one or more events, such as receipt of one or more notifications. Alert 14 generated by notification module 8 may include content, such as textual content, that notifies the user of computing device 2 of an event that caused notification module 8 to generate the associated alert. Examples of events at computing device 2 that may cause notification module 8 to generate associated alerts may include computing device 2 receiving a notification regarding receipt of a telephone call, a video call, an e-mail, a text message, and the like. Examples of events at computing device 2 that may cause notification module 8 to generate associated alerts may further include reminders regarding an upcoming meeting or appointment in a calendar application executing on computing device 2, time expiring in a timer application executing on computing device 2, and the like. In some alternate examples, alert 14 generated by notification module 8 may include any text and/or graphical content that may be presented in UI 12 and outputted by UI device 4.

In some examples, if computing device 2 is a wearable computing device, such as a smart watch, computing device 2 may act as a companion device to an external computing device (not shown), such as a smart phone. In this example, the external computing device may communicate with computing device 2 to cause notification module 8 to generate alert 14. For example, in response to receiving a text message, the external computing device may communicate a notification of the text message to computing device 2 to cause notification module 8 to generate alert 14. The external computing device may communicate to computing device 2 information that notification module 8 may include in alert 14, such as the type of alert 14, the sender of the text message, and the like. As shown in the example of FIG. 1, the content of alert 14 generated by notification module 8 in response to computing device 2 communicating with external computing device may include an indication that a new message has been received by the external computing device as well as an indication of the sender of the text message.

Notification module 8 may be implemented in various ways. For example, notification module 8 may be implemented as a downloadable or pre-installed application or "app." In another example, notification module 8 may be implemented as part of a hardware unit of computing device 2. In another example, notification module 8 may be implemented as part of an operating system of computing device 2. In some instances, portions of the functionality of notification module 8 or any other module described in this disclosure may be implemented across any combination of an application, hardware unit, and operating system.

Computing device 2 may include one or more sensors 10. In some examples, one or more sensors 10 may be configured to measure motion, orientation, position, various environmental conditions, and the like. In some examples, one or more sensors 10 may include one or more of an accelerometer, an ambient temperature sensor, a gravity sensor, a gyroscope, an ambient light sensor, a magnetic field sensor, an orientation sensor, a location sensor, a barometer, a proximity sensor, a relative humidity sensor, a rotation sensor, a pressure-sensitive input device, a camera, and the like. For example, if UI device 4 includes a pressure-sensitive display, then one or more sensors 10 may include the pressure-sensitive display. One or more sensors 10 may be implemented as part of a hardware unit of computing device 2, as software running on computing device 2, or a combination of hardware and software.

In some examples, the computing device may visually emphasize alert 14 in GUI 12 until computing device 2 receives user input to dismiss the alert. However, as time passes, alert 14 may become less contextually relevant than other information that may be visually emphasized in GUI 12. Therefore, if computing device 2 continues to visually emphasize alert 14 in GUI 12 until computing device 2 receives user input to dismiss alert 14, even if computing device 2 determines that alert 14 that is being visually emphasized is no longer the most contextually relevant information, then computing device 2 may be subverting its ordering of contextual priority by not visually emphasizing the most contextually relevant information, thereby providing the user of computing device 2 with contextually less relevant information.

In other examples, computing device 2 may determine a fixed time period after which the computing device 2 will dismiss or visually deemphasize alert 14, so that the most contextually relevant information is once again visually emphasized in GUI 12 after alert 14 is dismissed. However, if the determined time period for visually emphasizing alert 14 in GUI 12 is too short, computing device 2 may cease to visually emphasize alert 14 GUI 12 before the user of computing device 2 has an opportunity to view alert 14, thereby increasing the chance that the user of computing device 2 will miss alert 14 altogether.

Thus, notification module 8 may further perform one or more functions to determine the length of time for which alerts are visually emphasized at UI device 4. Notification module 8 may communicate the determined length of time for which alerts are visually emphasized to UI device module 6 to cause UI device 4 to visually emphasize the alerts for the length of time as determined by notification module 8.

Notification module 8 may determine the length of time to visually emphasize alert 14 in GUI 12 based at least in part on time intervals between user interactions with computing device 2 detected by one or more sensors 10. Notification module 8 may also determine the length of time to visually emphasize alert 14 in GUI 12 based at least in part on information regarding time intervals between user interactions with a plurality of remote computing devices.

In some examples, computing device 2 may communicate with server system 18 via network 30. Network 30 represents any public or private communication network, for instance, a cellular, Wi-Fi, and/or other type of network for transmitting data between computing devices. Computing device 2 and server system 18 may send and receive data across network 30 using any suitable communication techniques. For example, computing device 10 may be operatively coupled to network 30 using network link 32A. Server system 18 may be operatively coupled to network 30 by network link 32B. Network 30 may include network hubs, network switches, network routers, etc., that are operatively inter-coupled thereby providing for the exchange of information between computing device 2 and server system 18. In some examples, network links 32A and 32B may be Ethernet, ATM or other network connections. Such connections may be wireless and/or wired connections.

Server system 18 represents any suitable remote computing system, such as one or more desktop computers, laptop computers, mainframes, servers, cloud computing systems, etc. capable of sending and receiving information across network link 32B to network 30. In some examples, server system 18 represents a host server that collects data from remote computing devices regarding time intervals between user interactions with each of a plurality of remote computing devices. Computing device 2 may transmit information regarding time intervals between user interactions with computing device 2 and may also receive information regarding time intervals between user interactions with each of a plurality of remote computing devices that have provided such information to server system 18. In some examples, server system 18 represents a cloud computing system that provides such information through network 30 to computing device 2.

In the example of FIG. 1, GUI 12 may include different GUI states including GUI state 12A, GUI state 12B, and GUI state 12C. In GUI state 12A, notification module 8 has not yet generated alert 14. Furthermore, in GUI state 12A, content 15, which in this example is an example reminder of an upcoming appointment, is presented in GUI 12. In response to notification module 8 generating alert 14, GUI 12 may advance to GUI state 12B, where notification module 8 may enable alert 14 to be visually emphasized in GUI 12 for a length of time determined by notification module 8. As can be seen, when GUI 12 is in GUI state 12B, alert 14 is visually emphasized in GUI 12 relative to content 15 by occupying a bigger portion of GUI 12, by being presented in a relatively bigger and bolder font, and by presenting relatively more information in GUI 12 than content 15. In response to the end of the length of time to visually emphasize alert 14 in GUI 12, GUI 12 may advance to GUI state 12C, where alert 14 ceases to be visually emphasized in GUI 12. As can be seen, when GUI 12 is in GUI state 12C, alert 14 is visually de-emphasized in GUI 12 relative to other content in GUI 12, such as content 15. Instead, in GUI state 12C, content 15 is visually emphasized relative to alert 14 by occupying a bigger portion of GUI 12, by being presented in a relatively bigger and bolder font, and by presenting relatively more information in GUI 12 than alert 14.

In some examples, computing device 2 may organize information according to contextual priority associated with the information, so that computing device 2 may associate information that computing device 2 determines is more contextually relevant with a higher contextual priority than information that computing device 2 determines is less contextually relevant. For example, if computing device 2 determines that the current time is 5:30 PM, computing device 2 may associate a relatively higher contextual priority with information regarding the current traffic conditions from the location of the user's place of work to the location of the user's home, and computing device 2 may associate a relatively lower contextual priority with an alert of an upcoming meeting the following day. In this way, computing device 2 may create an ordering of information based on contextual priority.

In some examples, computing device 2 may visually emphasize the most contextually relevant information in GUI 12. However, computing device 2 may subvert the contextual ordering in response to generating an alert. In response to receiving and/or generating alert 14, computing device 2 may visually emphasize alert 14 in GUI 12 for the determined length of time even if alert 14 is associated with a lower contextual priority than other information that may be displayed at GUI 12. After the length of time elapses, computing device 2 may re-determine the contextual priority of information that may be displayed at GUI 12. If computing device 2 determines that alert 14 is not associated with the highest contextual priority out of the information that may be displayed at GUI 12, computing device 2 may visually deemphasize alert 14 in GUI 12 and may instead visually emphasize the information having the highest associated contextual priority in GUI 12. If computing device 2 determines that alert 14 remains associated with the highest contextual priority out of the information that may be displayed at GUI 12, computing device 2 may continue to visually emphasize alert 14 even after the length of time elapses.

In accordance with techniques of the present disclosure, computing device 2 may receive a plurality of indications of user interaction with computing device 2. Sensors 10 included in computing device 2 may measure one or more physical quantities and may output one or more signals indicative of the physical quantities measured by sensors 10. The signals output by sensor 10 may be indicative of user interaction with computing device 2. For example, if computing device 2 is a smart watch typically worn on a user's wrist, sensors 10 may include a tilt movement sensor that can measure tilt movements which may indicate that the user is tilting the wrist onto which computing device 2 is attached or lifting the arm onto which computing device 2 is attached in order to view UI device 4. In another example, if computing device 2 includes UI device 4, sensors 10 may also include one or more cameras that may capture the user's gaze, so that user interaction with computing device 2 may include any user gaze directed at UI device 4 and captured by sensors 10. In addition, non-exhaustive examples of user interaction with computing device 2 may further include user input received at one or more user input devices included in computing device 2 such as UI device 4, physical controls (e.g., buttons, switches, toggles, etc.), audio capture devices, accelerometers, gyroscopes, and the like.

Computing device 2 may receive the output signals from sensors 10 and may determine if the signals indicate user interaction with computing device 2 as detected by sensors 10. For example, if computing device 2 is a smart watch worn on the wrist of the user and if the output signals from sensors 10 include accelerometer readings, computing device 2 may determine, based on the accelerometer readings, whether the signals from sensors 10 indicate that computing device 2 is being lifted so that it is within the user's visual gaze, thereby indicating that the user is likely to be viewing UI device 4.

In another example, the output signals from sensors 10 may include signals from more than one of sensors 10. If the signals outputted by sensors 10 include both accelerometer readings as well as signals from one or more cameras included in sensors 10, computing device 2 may determine, based on the signals from the one or more cameras included in sensors 10, whether the user's gaze is directed at UI device 4. Computing device 2 may also determine, based on the accelerometer readings, whether the signals from sensor 10 indicate that computing device 2 is being lifted so that it is within the user's gaze. In this example, computing device 2 may determine that the user is interacting with computing device 2 if the signals from sensor 10 indicate both that the computing device 2 is being lifted towards the user's face and that the user's gaze is directed at UI device 4. In this way, computing device 2 may use multiple output signals that result from multiple measurements by multiple sensors in sensors 10 in combination to determine whether a valid user interaction with computing device 2 has occurred.

In accordance with techniques of the present disclosure, computing device 2 may determine a set of one or more time intervals between receiving at least two of the plurality of indications of user interaction with computing device 2. By determining the set of one or more time intervals between receiving at least two of the plurality of indications of user interaction with computing device 2, computing device 2 may determine how frequently the user uses or otherwise interacts with computing device 2. Computing device 2 may, based on how frequently the user interacts with computing device 2, determine how long to visually emphasize alert 14 in GUI 12 so that the user is likely to view alert 14 displayed at UI device 4 before alert 14 is no longer visually emphasized in GUI 12.

Determining the set of one or more time intervals between receiving at least two of the plurality of indications of user interaction with computing device 2 may include determining the set of one or more time intervals between receiving two consecutive indications of user interaction with computing device 2. For example, if computing device 2 receives consecutively a first, a second, and a third indication of user interaction with computing device 2, computing device 2 may determine a time interval between the first and second indications of user interaction with computing device 2, and computing device 2 may further determine a time interval between the second and third indications of user interaction with computing device 2.

Determining the set of one or more time intervals between receiving at least two of the plurality of indications of user interaction with computing device 2 may also include determining, for each of the at least two of the plurality of indications of user interaction with computing device 2, a likelihood that the indication of user interaction with computing device 2 indicates a user interaction that includes the user viewing UI device 4. For example, computing device 2 may associate a relatively higher likelihood that the indication of user interaction with computing device 2 indicates a user interaction that includes the user viewing UI device 4 to an indication of user interaction if sensors 10 detect the user gazing at UI device 4. Conversely, computing device 2 may associate a relatively lower likelihood that the indication of user interaction with computing device 2 indicates a user interaction that includes the user viewing UI device 4 to an indication of user interaction if sensors 10 detect physical movement of computing device 2 that is determined to not be the user lifting his/her arm onto which computing device 2 is attached in order to view UI device 4. In one example, the likelihood may be on a scale from 0 to 1, 0 to 100, and the like.

Computing device 2 may also determine a likelihood threshold above which the user interactions are deemed to include user viewing or gazing at UI device 4. In one example, if the likelihood that the indication of user interaction with computing device 2 indicates a user interaction that includes the user viewing UI device 4 ranges from 0 to 1, the likelihood threshold may be 0.75, such that if the likelihood exceeds 0.75, the associated user interaction may be deemed to include user viewing or gazing at UI device 4. By determining whether the likelihood associated with indications of user interaction with computing device 2 exceeds a likelihood threshold, computing device 2 may determine the set of one or more time intervals between receiving two non-consecutive indications of user interaction with computing device 2. In this way, computing device 2 may determine the set of one or more time intervals between two non-consecutive indications of user interactions with computing device 2 that are highly indicative of the user viewing UI device 4. For example, computing device 2 may consecutively receive a first, a second, and a third indication of user interaction with computing device 2. If the first and third indications of user interaction are each associated with likelihoods that exceed a specified likelihood threshold and if the second indication of user interaction with computing device 2 is associated with a likelihood that does not exceed the specified likelihood threshold, computing device 2 may determine a time interval between the first and third indications of user interaction with computing device 2 because computing device 2 may determine that only the user interactions indicated by the first and third indications are likely to be user interactions where the user views or gazes at UI device 4.

In accordance with techniques of the present disclosure, computing device 2 may determine, based at least in part on the determined set of one or more time intervals between receiving indications of user interaction, a length of time to visually emphasize alert 14 in GUI 12. Computing device 2 may adaptively determine the length of time to visually emphasize alert 14 in GUI 12 based on the set of one or more time intervals to increase the likelihood that the user of computing device 2 will take notice of alert 14 as alert 14 is being visually emphasized in GUI 12.

Computing device 2 may determine the length of time to visually emphasize alert 14 in GUI 12 to correspond to an average of the set of one or more time intervals. For example, computing device 2 may determine the length of time to visually emphasize alert 14 in GUI 12 to be at least as long as the average (e.g., the mean) length of the set of one or more time intervals. For example, if the average of the set of one or more time intervals is 10 seconds, computing device 2 may determine to visually emphasize alert 14 in GUI 12 for 10 seconds or for more than 10 seconds.

Computing device 2 may also determine the length of time to visually emphasize alert 14 in GUI 12 by determining a next expected user interaction with computing device 2 based on the set of one or more time intervals, so that computing device 2 may determine the length of time to visually emphasize alert 14 in GUI 12 so that the length of time to visually emphasize alert 14 in GUI 12 at least reaches the next expected user interaction with computing device 2.

Responsive to generating alert 14, computing device 2 may determine the next expected user interaction with computing device 2 by computing the difference in time between an average of the set of one or more time intervals and the elapsed time since computing device last received an indication of user interaction with computing device 2. For example, if computing device 2 last received an indication of user interaction with computing device 2 five seconds before receiving and/or creating alert 14, and if the average of the set of one or more time intervals between receiving indications of user interaction is 10 seconds, computing device 2 may determine the next expected user interaction to occur in 5 seconds and may therefore determine to visually emphasize alert 14 in GUI 12 for at least 5 seconds.

Computing device 2 may also determine the length of time to visually emphasize alert 14 in GUI 12 based on the context of computing device 2, such as the geographical location of computing device 2, the activity of the user of computing device 2, the time of the day, and the like. Computing device 2 may determine the length of time to visually emphasize alert 14 in GUI 12 based on the set of one or more time intervals determined within a specified time period, such as within the lifetime of computing device 2, within the last month, within the last 24 hours, and the like. The length of time to visually emphasize alert 14 in GUI 12 may also be based on the set of one or more time intervals determined in the same day in previous weeks, the same month in previous years, and the like. For example, computing device 2 may determine, on a Monday in December, the length of time to visually emphasize alert 14 in GUI 12 based on the set of one or more time intervals determined on past Mondays and/or set of one or more time intervals determined in previous months of December.

Computing device 2 may determine the length of time to visually emphasize alert 14 in GUI 12 based at least in part on the geographical location of computing device 2. For a particular geographical location, computing device 2 may determine the length of time to visually emphasize alert 14 in GUI 12 based on an average length of the set of one or more time intervals at the particular geographical location. For example, if computing device 2 is situated at the user's home, computing device 2 may determine the length of time to visually emphasize alert 14 in GUI 12 to correspond to the average length of the set of one or more time intervals between receiving two consecutive indications of user interaction with computing device 2 at the user's home. In another example, if computing device 2 is situated at the user's place of work, computing device 2 may determine the length of time to visually emphasize alert 14 in GUI 12 to correspond to the average length of the set of one or more time intervals between receiving two consecutive indications of user interaction with computing device 2 at the user's place of work. In this way, the length of time to visually emphasize alert 14 in GUI 12 determined by computing device 2 may be different from one location to another.

Computing device 2 may determine the length of time to visually emphasize alert 14 in GUI 12 based at least in part on the activity of the user of computing device 2, such that the length of time to visually emphasize alert 14 in GUI 12 may differ based on the user activity detected by computing device 2. For example, if computing device 2 determines that the user of computing device 2 is walking, computing device 2 may determine the length of time to visually emphasize alert 14 in GUI 12 to correspond to the average length of the set of one or more time intervals between receiving two consecutive indications of user interaction with computing device 2 while computing device 2 determines that the user is walking. In another example, if computing device 2 determines that the user of computing device 2 is sitting, computing device 2 may determine the length of time to visually emphasize alert 14 in GUI 12 to correspond to the average length of the set of one or more time intervals between receiving two consecutive indications of user interaction with computing device 2 while the user is sitting. In this way, the length of time to visually emphasize alert 14 in GUI 12 determined by computing device 2 may differ based on the user activity detected by computing device 2.

In another example, if the user is at the gym, the user may frequently interact with computing device 2, such as by using a stopwatch function of computing device 2 to time the amount of time the user spends at a particular exercise station. However, because the user at the gym may be more focused on the user's exercise, the user may pay less close attention to alerts displayed at UI device 4 when the user is at the gym than when the user is at other locations. Thus, if computing device 2 determines that computing device 2 is located at the user's gym, the computing device 2 may determine the length of time to visually emphasize alert 14 to be relatively longer than the length of time to visually emphasize alert 14 at other locations.

Computing device 2 may determine the length of time to visually emphasize alert 14 in GUI 12 based at least in part on the time of day. For example, computing device 2 may determine that the user may be unlikely to interact with computing device 2 during certain times of the day, such as overnight as the user is sleeping. Therefore, if computing device 2 receives and/or creates alert 14 after a specified time, such as after 11:00 PM, computing device 2 may visually emphasize alert 14 for a length of time until a specified time the next morning, such as 8:00 AM, to increase the likelihood that the user of computing device 2 will be awake and take notice of alert 14. In some examples, if computing device 2 is a smart watch, sensors 10 may detect that the user has removed computing device 2 from his/her wrist, and alert 14 received and/or created by computing device 2 after the user has removed computing device 2 from his/her wrist may remain visually emphasized in GUI 12 until sensors 10 detects that the user has put computing device 2 back on his/her wrist or that the user is interacting with computing device 2.

Computing device 2 may determine the length of time to visually emphasize alert 14 in GUI 12 based on information received from server system 16 regarding set of one or more time intervals between indications of user interaction a plurality of remote computing devices. Computing device 2 may use the information received from server system 16 similarly to the set of one or more time intervals between indications of user interaction with computing device 2 determined by computing device 2. For example, computing device 2 may determine the length of time to visually emphasize alert 14 in GUI 12 based at least in part on the average of the set of one or more time intervals between indications of user interaction with a plurality of remote computing devices.

In addition, the information received by computing device 2 from server system 16 may include context information associated with the set of one or more time intervals between indications of user interaction with the plurality of remote computing devices. Thus, computing device 2 may determine the length of time to visually emphasize alert 14 in GUI 12 based at least in part on the set of one or more time intervals between indications of user interaction with a plurality of remote computing devices that are associated with context that is similar to the current context of computing device 2. For example, if computing device 2 determines that the user of computing device 2 is currently walking, computing device 2 may determine the length of time to visually emphasize alert 14 in GUI 12 based at least in part on the set of one or more time intervals between indications of user interaction with a plurality of remote computing devices that have been determined while its users have been walking.

As can be seen from the aforementioned examples, the length of time to visually emphasize alert 14 in GUI 12 can adaptable based on many different variables and contexts. It should be understood that the aforementioned examples disclose just some of a variety of factors that may affect how computing device 2 determines the length of time to visually emphasize alert 14 in GUI 12.

In accordance with techniques of the present disclosure, computing device 2 may visually emphasize, for the length of time determined by computing device 2, alert 14 in GUI 12. Visually emphasizing for the length of time alert 14 in graphical user interface 12 may include visually emphasizing alert 14 for the length of time determined by computing device 2 upon computing device 2 generating alert 14, and may further include visually deemphasizing alert 14 in GUI 12 after the length of time expires.

Visually emphasizing alert 14 for the length of time may also include outputting, by computing device 2 for display at UI device 4, alert 14 for the length of time upon generating alert 14 and may further include ceasing to output, by computing device 2 for display at UI device 4, alert 14 after the length of time expires. Outputting alert 14 for display at UI device 4 may include outputting, by computing device 2 for display at UI device 4, textual, graphical, and/or video content associated with alert 14. For example, content associated with alert 14 may include information regarding the sender and the subject of an e-mail message, the time and location of an upcoming meeting, a picture posted by a social network contact, and the like.

In some examples, computing device 2 may enable the user to interact with alert 14, such that alert 14 may be a selectable element in GUI 12. For example, if UI device 4 includes a presence-sensitive display, UI device 4 may detect user input at or near the presence-sensitive display that is indicative of user selection of alert 14. If alert 14 includes information regarding an upcoming meeting, user input indicative of user selection of alert 14 may cause computing device 2 to launch a calendar application. In another example, if alert 14 includes information regarding a newly received e-mail message, user input indicative of user selection of alert 14 may cause computing device to launch an e-mail application and to output, for display at UI device 4, the e-mail message associated with alert 14.

Visually emphasizing the alert in the graphical user interface may also include displaying relatively more information associated with alert 14 in GUI 12 for the length of time and displaying relatively less information associated with alert 14 in GUI 12 after the length of time. For example, as shown in FIG. 1, when alert 14 is visually emphasized for the length of time, GUI 12 may display both "Missed Call" and the phone number "555-5555". When alert 14 is visually deemphasized after being visually emphasized for the length of time, GUI 12 may display "Missed Call" but may not display the phone number "555-5555". Computing device 2 may also deemphasize alert 14 after being visually emphasized for the length of time by visually emphasizing another alert or another piece of content, such as information 15.

Visually emphasizing alert 14 in GUI 12 may also include visually deemphasizing other graphical and/or textual elements in GUI 12. For example, computing device 2 may change the font size, the text style, the text color, and the like of alert 14 so that the alert 14 is visually emphasized compared to other graphical and textual elements in GUI 12. For example, the font size of alert 14 may be increased so that it is larger than other content in GUI 12. In another example, alert 14 may also occupy a relatively larger amount of real estate of GUI 12 compared to other elements in GUI 12. In some examples, visually emphasizing alert 14 in GUI 12 may also include enabling alert 14 to take up the entirety of GUI 12 so that other content are not displayed in GUI 12 alongside alert 14. Computing device 2 may also change the font size, the text style, the text color, and the like of information 15 to visually deemphasize information 15 in GUI 12. For example, the font size of information 15 may be decreased so that it is smaller than the font size of alert 14.

Figure 2:
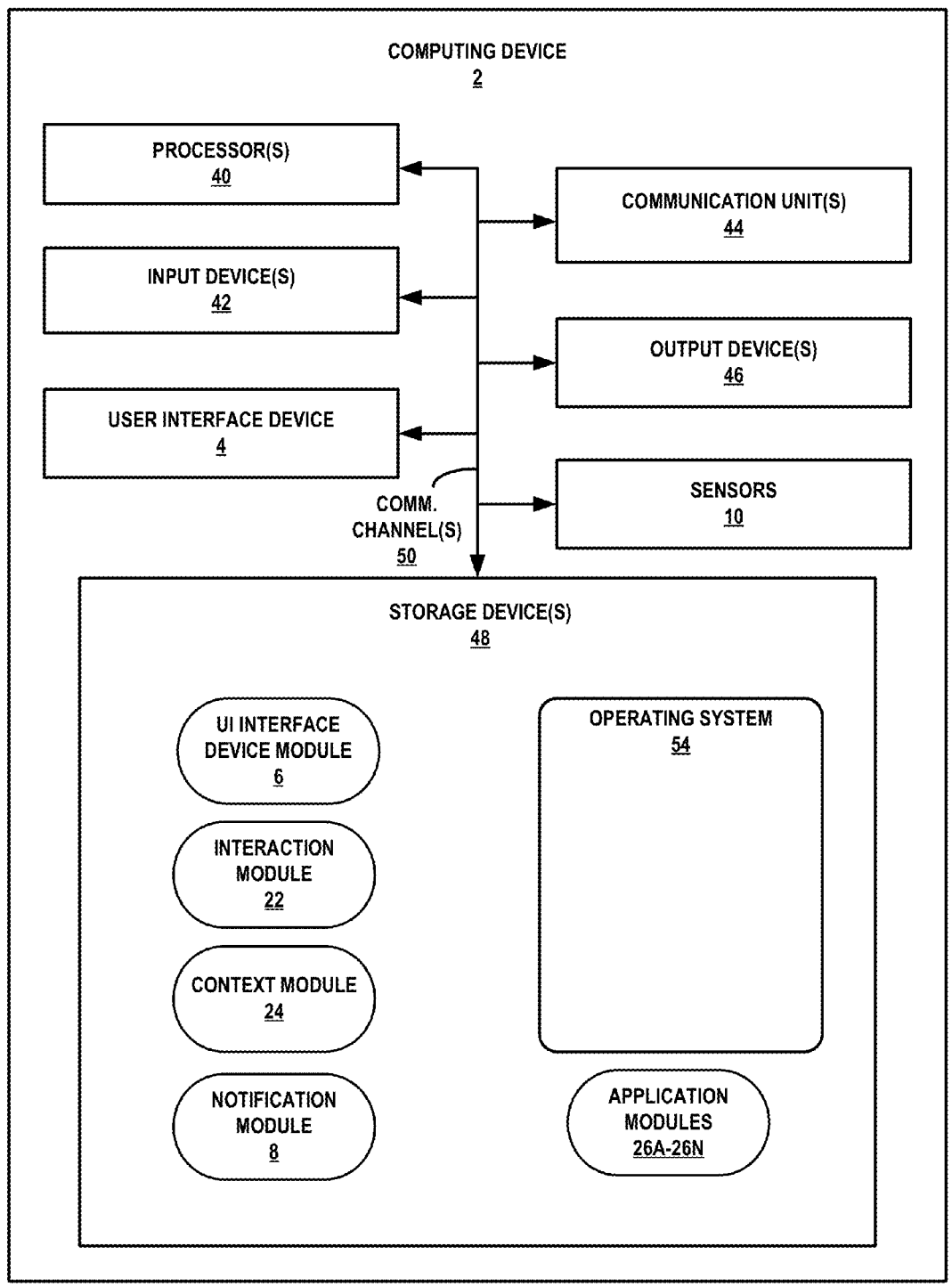
FIG. 2 is a block diagram illustrating an example computing device configured to adaptively determine the length of time to visually emphasize an alert in accordance with one or more aspects of the present disclosure.

FIG. 2 is a block diagram illustrating an example computing device configured to adaptively determine the length of time to visually emphasize an alert in accordance with one or more aspects of the present disclosure. Computing device 2 of FIG. 2 is described below within the context of computing device 2 of FIG. 1. FIG. 2 illustrates only one particular example of computing device 2 of system 1, and many other examples of computing device 2 may be used in other instances and may include a subset of the components included in example computing device 2 or may include additional components not shown in FIG. 2.

As shown in the example of FIG. 2, computing device 2 includes user interface device 4 ("UID 4"), one or more processors 40, one or more input devices 42, one or more communication units 44, one or more output devices 46, one or more storage devices 48, and sensors 10. Storage devices 48 of computing device 2 also include UI module 6, notification module 8, interaction module 22, context module 24, application modules 26A-26N ("application modules 26"), and operating system 54. Communication channels 50 may interconnect each of the components 4, 6, 10, 6, 8, 22, and 24, 26, 40, 42, 44, 46, 48, and 54 for inter-component communications (physically, communicatively, and/or operatively). In some examples, communication channels 50 may include a system bus, a network connection, an inter-process communication data structure, or any other method for communicating data.

One or more input devices 42 of computing device 2 may receive input. Examples of input are tactile, audio, and video input. Input devices 42 of computing device 2, in one example, includes a presence-sensitive display, touch-sensitive screen, mouse, keyboard, voice responsive system, video camera, microphone or any other type of device for detecting input from a human or machine.

One or more output devices 46 of computing device 2 may generate output. Examples of output are tactile, audio, and video output. Output devices 46 of computing device 2, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 2 may communicate with external devices via one or more networks by transmitting and/or receiving network signals on the one or more networks. For example, computing device 2 may use communication unit 44 to send and receive data to and from information server system 60 of FIG. 1. Computing device 2 may use communication unit 44 to transmit and/or receive radio signals on a radio network such as a cellular radio network. Likewise, communication units 44 may transmit and/or receive satellite signals on a satellite network such as a global positioning system (GPS) network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless Ethernet network radios, as well as universal serial bus (USB) controllers.

In some examples, UID 4 of computing device 2 may include functionality of input devices 42 and/or output devices 46. In the example of FIG. 2, UID 4 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x, y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 4 presents a user interface (such as user interface 12 of FIG. 1).

While illustrated as an internal component of computing device 2, UID 4 also represents and external component that shares a data path with computing device 2 for transmitting and/or receiving input and output. For instance, in one example, UID 4 represents a built-in component of computing device 2 located within and physically connected to the external packaging of computing device 2 (e.g., a screen on a mobile phone). In another example, UID 4 represents an external component of computing device 2 located outside and physically separated from the packaging of computing device 2 (e.g., a monitor, a projector, etc. that shares a wired and/or wireless data path with a tablet computer).

Sensors 10 in computing device 10 may measure physical quantities and convert the measured physical quantities into signals that may be processed by one or more processors 40. The physical quantities measured by sensors 10 may include light, motion, temperature, magnetic fields, gravity, humidity, moisture, vibration, pressure, electrical fields, sound, physical movement, and the like that may be indicative of user interaction with computing device 10. Sensors 10 may convert the measured physical quantities into signals, such as electrical signals, optical signals, and the like, that may indicate user interaction with computing device 10. Examples of sensors 10 may include one or more of an accelerometer, an ambient temperature sensor, a gravity sensor, a gyroscope, an ambient light sensor, a magnetic field sensor, an orientation sensor, a location sensor, a barometer, a proximity sensor, a relative humidity sensor, a rotation sensor, a pressure-sensitive input device, a camera, and other sensors known in the art.

One or more storage devices 48 within computing device 2 may store information for processing during operation of computing device 2 (e.g., computing device 2 may store data accessed by modules 6, 8, 22, and 24 during execution at computing device 2). In some examples, storage device 48 is a temporary memory, meaning that a primary purpose of storage device 48 is not long-term storage. Storage devices 48 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 6, 8, 22, and 24.

One or more processors 40 may implement functionality and/or execute instructions within computing device 2. For example, processors 40 on computing device 2 may receive and execute instructions stored by storage devices 48 that execute the functionality of UI device module 6, notification module 8, interaction module 22, context module 24, application modules 26, and operating system 54. These instructions executed by processors 40 may cause computing device 2 to store information, within storage devices 48 during program execution. Processors 40 may execute instructions of modules 6, 8, 22, and 24 to cause UI device 4 to present GUI 12 and to visually emphasize alert 14 in GUI 12. That is, modules 6, 8, 22, and 24 may be operable by processors 40 to perform various actions or functions of computing device 2.

Computing device 2 may be part of a mobile communications network. Computing device 2 may exchange data with a server or cloud computing system over the mobile communications network via one or more communication units 44. The server or cloud computing system may perform some or all of the techniques and operations related to modules 20, 22, 24, and 26 described herein. In other words, some or all of the techniques and operations related to modules 6, 8, 22, and 24 can be implemented locally at computing device 2, for instance, a mobile phone, and some or all of the techniques and operations may be performed remotely via a server connected to the mobile communications network that exchanges data with computing device 2. In other words, while shown in FIG. 2 as being included within computing device 2, modules 6, 8, 22, and 24 may be a part of a remote computing system and may execute as one or more remote computing services, such as one or more services provided by a cloud and/or cluster based computing system.

Operating system 54 may execute to cause computing device 2 to perform various functions to manage hardware resources of computing device 2 and to provide various common services for other computer programs. Application modules 26 may cause computing device 10 to provide various applications (e.g., "apps").

Context module 24 of computing device 2 may determine the current context of computing device 2, such as the current location, the current time, the likely current activity of the user of computing device 2, and the like. For example, based on signals outputted by sensors 10 that are indicative of measurements made by sensor 10, context module 24 may determine that the user of computing device 2 is walking, running, driving or riding in a motor vehicle, and the like.

Interaction module 22 of computing device 2 may determine the probability that a user interaction with computing device 2 includes the user viewing UI device 4, and may further determine set of one or more time intervals between such user interactions with computing device 2 that are highly probable to include the user viewing UI device 4. Interaction module 22 may also associate the current context determined by context module 24 with the one or more intervals between user interactions determined by interaction module 22, so that, for example, interaction module 22 may associate a set of time intervals with a specific geographic location (e.g., the user's home), a set of time intervals with a specific user activity (e.g., in the context of when the user is walking a specific route), a set of time intervals with a specific time and day (e.g., 4:00 PM on Monday), and the like.

Notification module 8 of computing device 2 may generate one or more alerts, such as alert 14, in response to one or more events. The one or more events may include communication units 44 receiving certain data, such as data indicative of a new e-mail message. The one or more events may also include events generated by operating system 54 or applications module 26 executing on processors 40, such as an alert for an upcoming appointment generated by a calendar application in applications module 26.

Notification module 8 may also determine a duration in which to visually emphasize alert 14 in GUI 12 based on at least one or more of the set of one or more time intervals between user interactions determined by interaction module 22 and the current context of computing device 2 determined by context module 24. Given the current context of computing device 2, such as the current location, the current time, and the like, notification module 8 may determine the duration in which to visually emphasize alert 14 in GUI 12 based on a set of the one or more intervals between user interactions that is associated with the current context of computing device 2. For example, notification module 8 may determine the duration in which to visually emphasize alert 14 in GUI 12 based on the set of the one or more intervals between user interactions that is associated with the current location of computing device 2.

UI device module 6 may receive data from notification module 8. Using the data, UI device module 6 may cause other components associated with computing device 2, such as UI device 4, to provide output based on the data. For instance, UI device module 6 may receive data from notification module 8 that causes UI device 4 to display information, such as alert 14, within GUI 12. UI device module 6 may also receive data from notification module 8 that causes alert 14 to be visually emphasized for the duration determined by notification module 8.

Figure 3:
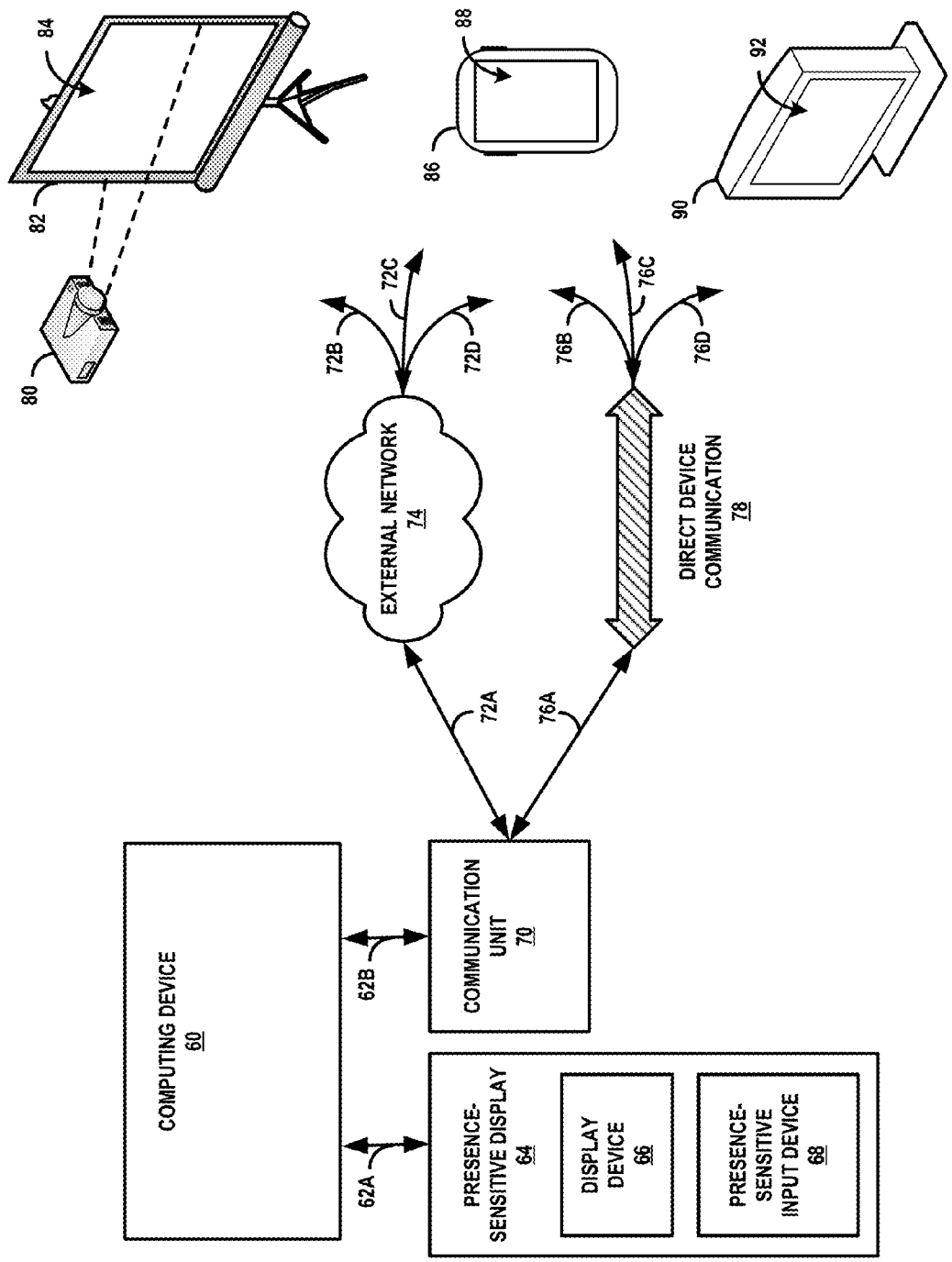
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a stand-alone computing device 2, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processor 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 2 in FIGS. 1-2, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 64 may include display device 66 and presence-sensitive input device 68. Display device 66 may, for example, receive data from computing device 60 and display the graphical content. In some examples, presence-sensitive input device 68 may determine one or more inputs (e.g., continuous gestures, multi-touch gestures, single-touch gestures, etc.) at presence-sensitive display 64 using capacitive, inductive, and/or optical recognition techniques and send indications of such input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed. In other examples, presence-sensitive input device 68 may be positioned physically apart from display device 66, and locations of presence-sensitive input device 68 may correspond to locations of display device 66, such that input can be made at presence-sensitive input device 68 for interacting with graphical elements displayed at corresponding locations of display device 66.

As shown in FIG. 3, computing device 60 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 60 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more inputs (e.g., continuous gestures, multi-touch gestures, single-touch gestures, etc.) at projector screen 82 using optical recognition or other suitable techniques and send indications of such input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of UI device 4 as described in this disclosure. In some examples, presence-sensitive display 84 may include additional functionality. Projector screen 82 (e.g., an electronic display of computing eye glasses) may receive data from computing device 60 and display the graphical content. In some examples, presence-sensitive display 84 may determine one or more inputs (e.g., continuous gestures, multi-touch gestures, single-touch gestures, etc.) at projector screen 82 using capacitive, inductive, and/or optical recognition techniques and send indications of such input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, computerized watches, computerized eyeglasses, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88 and 92 may include a subset of functionality or all of the functionality of UID 4 as described in this disclosure. In some examples, presence-sensitive displays 88 and 92 may include additional functionality. In any case, presence-sensitive display 92, for example, may receive data from computing device 60 and display the graphical content. In some examples, presence-sensitive display 92 may determine one or more inputs (e.g., continuous gestures, multi-touch gestures, single-touch gestures, etc.) at projector screen using capacitive, inductive, and/or optical recognition techniques and send indications of such input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 78B, 78C, and 78D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, Wi-Fi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In the example of FIG. 3, computing device 60 may output a GUI, such as GUI 12 illustrated in FIG. 1, for display by a display device (e.g., display device 66, presence-sensitive displays 84, 88, 92, etc.). Computing device 60 may determine a length of time to visually emphasize an alert, such as alert 14 illustrated in FIG. 1, in the GUI displayed by the display device, and may cause the GUI displayed by the display device to visually emphasize the alert for the determined length of time. If computing device 60 outputs graphical content for display at one or more remote devices, such as projector 80, projector screen 82, mobile device 86, and visual display device 90, computing device 60 may determine the length of time to visually emphasize the alert based on one or more intervals between receiving at least two of a plurality of indications of user interaction with the one or more remote devices because user interaction with the remote devices may be more indicative that the user has viewed the remote devices than user interaction with computing device 60.

Figure 4:
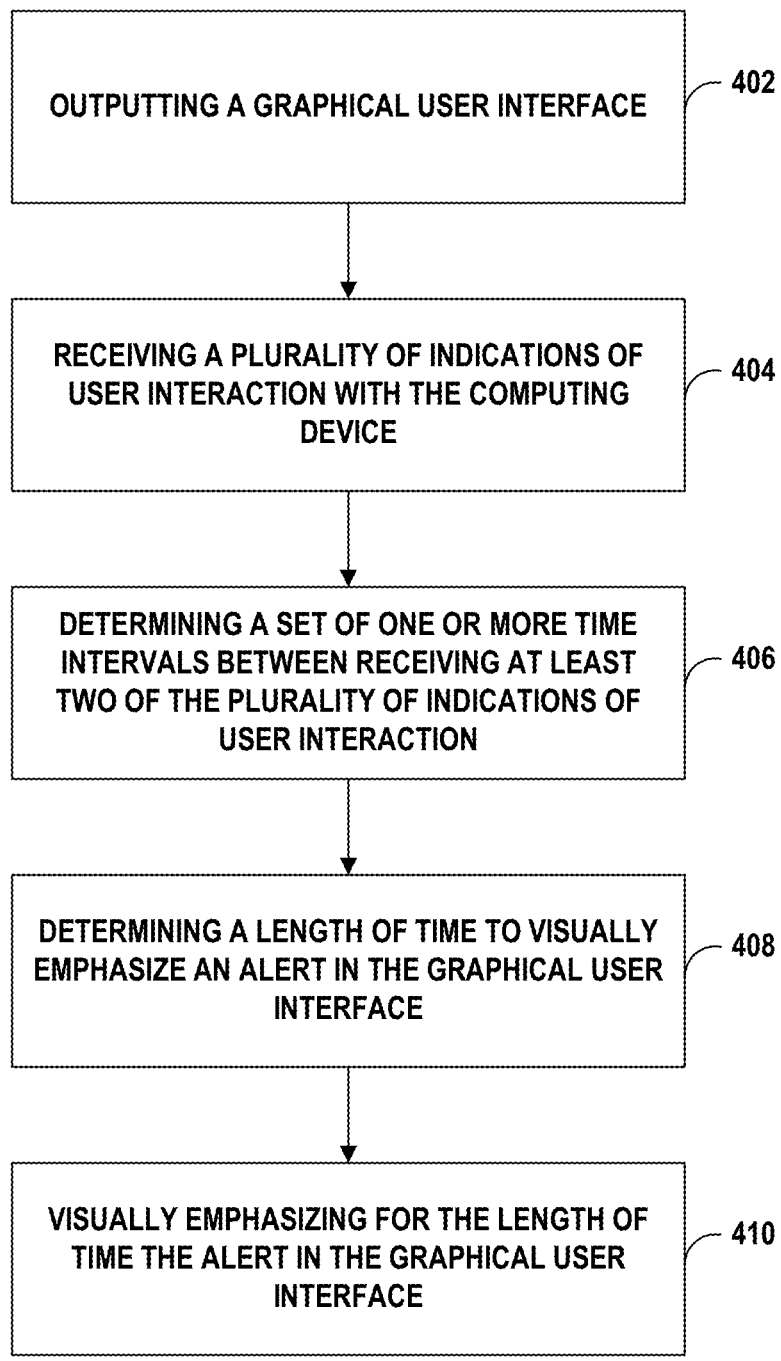
FIG. 4 is a flowchart illustrating example operations of an example computing device configured to adaptively determine the length of time to visually emphasize an alert in accordance with one or more aspects of the present disclosure.

FIG. 4 is a flowchart illustrating example operations of example computing device 2 configured to adaptively determine the length of time to visually emphasize an alert in accordance with one or more aspects of the present disclosure. The operations of computing device 2 are described within the context of computing device 2 of FIG. 1 and FIG. 2.

As shown in FIG. 4, computing device 2 may output for display at a display device, such as UI device 4, graphical user interface 12 (402). Computing device 2 may receive a plurality of indications of user interaction with computing device 2 (404). In some examples, computing device 2 may receive one or more signals from one or more sensors 10 that are indicative of user interaction with computing device 2. In some examples, computing device 2 may receive from a sensor from one or more sensors 10 a signal from the one or more signals indicative of physical movement of computing device 2. In some examples, computing device 2 may receive from a sensor from one or more sensors 10 a signal from the one or more signals indicative of a glance at the display device. In some examples, computing device 2 may receive from a sensor from one or more sensors 10 a signal from the one or more signals indicative of user input.

Computing device may determine a set of one or more time intervals between receiving at least two of the plurality of indications of user interaction with computing device 2 (406). Computing device 2 may determine based at least in part on the set of one or more time intervals, a length of time to visually emphasize alert 14 in graphical user interface 12 (408). In some examples, computing device 2 may further include determining, based on the set of one or more time intervals, a time of a next expected user interaction with computing device 2 and may determine, based on the time of the next expected user interaction with the computing device, the length of time to visually emphasize alert 14 in graphical user interface 12. In some examples, computing device 2 may determine the length of time to visually emphasize alert 14 in graphical user interface 12 further based at least in part on a second set of one or more time intervals between receiving a second plurality of indications of user interaction determined by each of a plurality of remote computing devices.

In some examples, computing device 2 may determine a length of time to visually emphasize alert 14 in graphical user interface 12 further based at least in part on a context of computing device 2. The context of computing device 2 may include a geographical location of computing device 2. The context of computing device 2 may also include a current time. The context of computing device 2 may also include a current activity of a user of computing device 2.

The computing device may visually emphasize for the length of time, alert 14 in the graphical user interface 12 (410). In some examples, in response to alert 14 being visually emphasized for the length of time in graphical user interface 12, computing device 2 may visually deemphasize alert 14 in graphical user interface 12.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Clause 1. A method comprising: outputting, by a computing device, for display at a display device, a graphical user interface; receiving, by the computing device, a plurality of indications of user interaction with the computing device; determining, by the computing device, set of one or more time intervals between receiving at least two of the plurality of indications of user interaction with the computing device; determining, by the computing device and based at least in part on the set of one or more time intervals, a length of time to visually emphasize an alert in the graphical user interface; and visually emphasizing, by the computing device and for the length of time, the alert in the graphical user interface.

Clause 2. The method of clause 1, wherein determining, by the computing device and based at least in part on the set of one or more time intervals, a length of time to visually emphasize the alert is further based at least in part on a context of the computing device.

Clause 3. The method of any of clauses 1-2, wherein determining, by the computing device and based at least in part on the set of one or more time intervals, a length of time to visually emphasize the alert is further based at least in part on a context of the computing device.

Clause 4. The method of any of clauses 1-3, wherein receiving, by the computing device, a plurality of indications of user interaction with the computing device further comprises: determining, by the computing device, for each respective indication of user interaction of the plurality of indications of user interaction, a respective likelihood that a user interaction associated with the respective indication of user interaction includes a user viewing the display device; and determining, by the computing device, for each respective indication of user interaction of the plurality of indications of user interactions, whether the respective likelihood that the user interaction associated with the respective indication of user interaction includes a user viewing the display device exceeds a threshold.

Clause 5. The method of any of clauses 1-4, wherein determining, by the computing device, the set of one or more time intervals between receiving at least two of the plurality of indications of user interaction with the computing device further comprises: determining, by the computing device, a second set of one or more time intervals between receiving at least two of the plurality of indications of user interaction, wherein each respective time interval from the second set of one or more time intervals is associated with a respective likelihood that the user interaction includes a user viewing the display device exceeds the threshold.

Clause 6. The method of any of clauses 1-5, wherein determining, by the computing device and based at least in part on the set of one or more time intervals, a length of time to visually emphasize an alert in the graphical user interface further comprises: determining, by the computing device and based at least in part on the second set of one or more time intervals, the length of time to visually emphasize the alert in the graphical user interface.

Clause 7. The method of any of clauses 1-6, wherein determining, by the computing device and based at least in part on the second set of one or more time intervals, the length of time to visually emphasize the alert in the graphical user interface further comprises: determining, by the computing device and based at least in part on an average of the second set of one or more time intervals, the length of time to visually emphasize the alert in the graphical user interface.

Clause 8. The method of any of clauses 1-8, wherein determining a length of time to visually emphasize an alert is further based at least in part on respective sets of one or more time intervals between a corresponding remote computing device from a plurality of remote computing devices receiving at least two indications of user interaction from a corresponding plurality of indications of user interactions.

Clause 9. A computer-readable storage medium encoded with instructions that, when executed, cause at least one processor of a computing device to: output, by the computing device, for display at a display device, a graphical user interface; receive, by the computing device, a plurality of indications of user interaction with the computing device; determine, by the computing device, a set of one or more time intervals between receiving at least two of the plurality of indications of user interaction with the computing device; determine, by the computing device and based at least in part on the set of one or more time intervals, a length of time to visually emphasize an alert in the graphical user interface; and visually emphasize, by the computing device and for the length of time, the alert in the graphical user interface.

Clause 10. The computer-readable storage medium of clause 9, wherein determine the length of time to visually emphasize an alert is further based at least in part on a context of the computing device.

Clause 11. The computer-readable storage medium of any of clauses 9-10, wherein determining the length of time to visually emphasize the alert in the graphical user interface further comprises: determine, by the computing device and based on the set of one or more time intervals, a time of a next expected user interaction with the computing device; and determine, by the computing device and based on the time of the next expected user interaction with the computing device, the length of time to visually emphasize the alert in the graphical user interface.

Clause 12. The computer-readable storage medium of any of clauses 9-11, wherein receive, by the computing device, a plurality of indications of user interaction with the computing device further comprises: determine, by the computing device for each respective indication of user interaction of the plurality of indications of user interaction, a respective likelihood that a user interaction associated with the respective indication of user interaction includes a user viewing the display device; and determine, by the computing device for each respective indication of user interaction of the plurality of indications of user interactions, whether the respective likelihood that the user interaction associated with the respective indication of user interaction includes a user viewing the display device exceeds a threshold.

Clause 13. The computer-readable storage medium of any of clauses 9-12, wherein determine, by the computing device, the set of one or more time intervals between receiving at least two of the plurality of indications of user interaction with the computing device further comprises: determine, by the computing device, a second set of one or more time intervals between receiving at least two of the plurality of indications of user interaction, wherein each respective time interval from the second set of one or more time intervals is associated with a respective likelihood that the user interaction includes a user viewing the display device exceeds the threshold.

Clause 14. The computer-readable storage medium of any of clauses 9-13, wherein determining, by the computing device and based at least in part on the set of one or more time intervals, a length of time to visually emphasize an alert in the graphical user interface further comprises: determine, by the computing device and based at least in part on the second set of one or more time intervals, the length of time to visually emphasize the alert in the graphical user interface.

Clause 15. A computing system comprising: at least one processor; and at least one module operable by the at least one processor to: output for display at a display device a graphical user interface; receive a plurality of indications of user interaction with the computing device; determine a set of one or more time intervals between receiving at least two of the plurality of indications of user interaction with the computing device; determine, based at least in part on the set of one or more time intervals, a length of time to visually emphasize an alert in the graphical user interface; and visually emphasize for the length of time the alert in the graphical user interface.

Clause 16. The computing system of clause 15, wherein the at least one module is further operable by the at least one processor to determine the length of time to visually emphasize the alert based at least in part on a context of the computing device.

Clause 17. The computing system of any of clauses 15-16, wherein the at least one module is further operable by the at least one processor to: determine, based on the set of one or more time intervals, a time of a next expected user interaction with the computing device; and determine, based on the time of the next expected user interaction with the computing device, the length of time to visually emphasize the alert in the graphical user interface.

Clause 18. The computing system of any of clauses 15-17, wherein receive a plurality of indications of user interaction with the computing device further comprises: determine, for each respective indication of user interaction of the plurality of indications of user interaction, a respective likelihood that a user interaction associated with the respective indications of user interaction includes a user viewing the display device; and determine, for each respective indication of user interaction of the plurality of indications of user interactions, whether the respective likelihood that the user interaction associated with the respective indications of user interaction includes a user viewing the display device exceeds a threshold.

Clause 19. The computing system of any of clauses 15-18, wherein determine the set of one or more time intervals between receiving at least two of the plurality of indications of user interaction with the computing device further comprises: determine a second set one or more time intervals between receiving at least two of the plurality of indications of user interaction, wherein each respective time interval from the second set of one or more time intervals is associated with a respective likelihood that the user interaction includes a user viewing the display device exceeds the threshold.

Clause 20. The computing system of any of clauses 15-19, wherein determine, based at least in part on the set of one or more time intervals, a length of time to visually emphasize an alert in the graphical user interface further comprises: determine, based at least in part on the second set of one or more time intervals, the length of time to visually emphasize the alert in the graphical user interface.

Clause 21. A computing device comprising means for performing the method recited in any of clauses 1-8.

Clause 22. A computer-readable storage medium comprising instructions that, when executed, cause one or more processors of a computing device to perform the method recited by any of clauses 1-8.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method comprising:
    outputting, by a computing device, for display at a display device, a graphical user interface;
    receiving, by one or more processors of the computing device from one or more sensors of the computing device, signals indicative of a plurality of user interactions with the computing device, wherein the one or more sensors include at least one of an accelerometer or an image capture device;
    determining, by the one or more processors, a first time interval between a first user interaction and a second user interaction of the plurality of user interactions, and a second time interval between the second user interaction and a third user interaction of the plurality of user interactions, wherein at least one of the first user interaction, the second user interaction, or the third user interaction includes at least one of a tilt movement of the computing device or a user gaze directed at the display device;
    determining, by the one or more processors, a time at which a next user interaction is expected to occur based at least in part on the first time interval, the second time interval, and an elapsed time since a most recent user interaction; and
    in response to the one or more processors generating an alert, visually emphasizing, by the computing device, the alert in the graphical user interface for a length of time until at least the time at which the next user interaction is expected to occur.

2. The method of claim 1, further comprising:
    increasing, by the one or more processors, the length of time to visually emphasize the alert based at least in part on a geographical location of the computing device at the time the computing device generates the alert.

3. The method of claim 1, wherein receiving, by the computing device from the one or more sensors of the computing device, the signals indicative of the plurality of user interactions with the computing device further comprises:
    determining, by the computing device, for each respective user interaction of the plurality of user interactions, a respective likelihood of the display device being viewed; and
    determining, by the computing device, for each respective user interaction of the plurality of user interactions, whether the respective likelihood of the display device being viewed exceeds a likelihood threshold.

4. The method of claim 3, further comprising:
    determining, by the computing device, that each of the first user interaction, the second user interaction, and the third user interaction is each associated with a likelihood of the display device being viewed that exceeds the likelihood threshold.

5. The method of claim 1, wherein determining, by the computing device, the time at which the next user interaction is expected to occur based at least in part on the plurality of time intervals and the elapsed time since the most recent user interaction further comprises:
    determining, by the computing device, the time at which the next user interaction is expected to occur based at least in part on the elapsed time since the most recent user interaction and an average of at least the first time interval and the second time interval.

6. The method of claim 1, wherein determining, by the computing device, the time at which the next user interaction is expected to occur based at least in part on the plurality of time intervals and the elapsed time since the most recent user interaction further comprises:
    determining, by the computing device, the time at which the next user interaction is expected to occur based further at least in part on respective sets of two or more time intervals between at least two user interactions from a corresponding plurality of user interactions received by a corresponding remote computing device of a plurality of remote computing devices.

7. A non-transitory computer-readable storage medium encoded with instructions that, when executed, cause at least one processor of a computing device to:
    output for display at a display device, a graphical user interface;
    receive, from one or more sensors of the computing device, signals indicative of a plurality of user interactions with the computing device, wherein the one or more sensors include at least one of an accelerometer or an image capture device;
determine a first time interval between a first user interaction and a second user interaction of the plurality of user interactions, and a second time interval between the second user interaction and a third user interaction of the plurality of user interactions, wherein at least one of the first user interaction, the second user interaction, or the third user interaction includes at least one of a tilt movement of the computing device or a user gaze directed at the display device;
determine a time at which a next user interaction is expected to occur based at least in part on the first time interval, the second time interval, and an elapsed time since a most recent user interaction; and
in response to the at least one processor generating an alert, visually emphasize the alert in the graphical user interface for a length of time until at least the time at which the next user interaction is expected to occur.

8. The non-transitory computer-readable storage medium of claim 7, wherein the instructions, when executed, further cause the at least one processor to:
increase the length of time to visually emphasize the alert based at least in part on a geographical location of the computing device at the time the computing device generates the alert.

9. The non-transitory computer-readable storage medium of claim 7, wherein receive, by the at least one processor of the computing device from the one or more sensors of the computing device, the signals indicative of the plurality of user interactions with the computing device further comprises:
determine, for each respective user interaction of the plurality of user interactions, a respective likelihood of the display device being viewed; and
determine, for each respective user interaction of the plurality of user interactions, whether the respective likelihood of the display device being viewed exceeds a likelihood threshold.

10. The non-transitory computer-readable storage medium of claim 9, wherein the instructions, when executed, further cause the at least one processor to:
determine that each of the first user interaction, the second user interaction, and the third user interaction is each associated with a likelihood of the display device being viewed that exceeds the likelihood threshold.

11. A computing system comprising:
at least one processor; and
at least one module operable by the at least one processor to:
output for display at a display device a graphical user interface;
receive from one or more sensors signals indicative of a plurality of user interactions with the computing system, wherein the one or more sensors include at least one of an accelerometer or an image capture device;
determine a first time interval between a first user interaction and a second user interaction of the plurality of user interactions, and a second time interval between the second user interaction and a third user interaction of the plurality of user interactions, wherein at least one of the first user interaction, the second user interaction, or the third user interaction includes at least one of a tilt movement of the computing device or a user gaze directed at the display device;
determine a time at which a next user interaction is expected to occur based at least in part on the first time interval, the second time interval, and an elapsed time since a most recent user interaction; and
in response to the at least one processor generating an alert, visually emphasize the alert in the graphical user interface for a length of time until at least the time at which the next user interaction is expected to occur.

12. The computing system of claim 11, wherein the at least one module is further operable by the at least one processor to increase the length of time to visually emphasize the alert based at least in part on a geographical location of the computing system at the time the computing system generates the alert.

13. The computing system of claim 11, wherein receive from one or more sensors signals indicative of a plurality of user interactions with the computing system further comprises:
determine, for each respective user interaction of the plurality of user interactions, a respective likelihood of the display device being viewed; and
determine, for each respective user interaction of the plurality of user interactions, whether the respective likelihood of the display device being viewed exceeds a likelihood threshold.

14. The computing system of claim 13, wherein the at least one module is further operable by the at least one processor to:
determine that each of the first user interaction, the second user interaction, and the third user interaction is each associated with a likelihood of the display device being viewed that exceeds the likelihood threshold.

* * * * *